(12) United States Patent
Kawaguchi

(10) Patent No.: US 9,992,368 B2
(45) Date of Patent: Jun. 5, 2018

(54) COMMUNICATION CONTROL METHOD FOR CONTROLLING COMMUNICATION WITH USB DEVICES, STORAGE MEDIUM, AND PRINTING APPARATUS

(71) Applicant: CANON KABUSHIKI KAISHA, Tokyo (JP)

(72) Inventor: Tadashi Kawaguchi, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/417,633

(22) Filed: Jan. 27, 2017

(65) Prior Publication Data

US 2017/0230524 A1 Aug. 10, 2017

(30) Foreign Application Priority Data

Feb. 8, 2016 (JP) .................. 2016-021842

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ..... *H04N 1/00891* (2013.01); *H04N 1/00129* (2013.01); *H04N 2201/001* (2013.01); *H04N 2201/0013* (2013.01); *H04N 2201/0036* (2013.01); *H04N 2201/0049* (2013.01); *H04N 2201/0094* (2013.01)

(58) Field of Classification Search
CPC ........... H04N 1/00891; H04N 1/00129; H04N 2201/001; H04N 2201/0013; H04N 2201/0036; H04N 2201/0049; H04N 2201/0094

USPC ........................ 358/1.1, 1.13, 1.15
See application file for complete search history.

(56) References Cited

U.S. PATENT DOCUMENTS

| 2011/0058214 | A1* | 3/2011 | Park ................. G06F 1/3209 358/1.15 |
| 2011/0161531 | A1* | 6/2011 | Katayama ........... G06F 3/1211 710/14 |
| 2012/0221736 | A1 | 8/2012 | Endo et al. |
| 2012/0257247 | A1* | 10/2012 | Yamasaki .......... G06K 15/4055 358/1.15 |

FOREIGN PATENT DOCUMENTS

JP 5745424 B2 7/2015

* cited by examiner

*Primary Examiner* — Douglas Tran
(74) *Attorney, Agent, or Firm* — Rossi, Kimms & McDowell LLP

(57) ABSTRACT

A communication control method which prevents control over a USB device from being hampered and reducing power consumption at the same time. When the USB device and a control apparatus, which controls the USB device, are connected to the printing apparatus, and a communication via the printing apparatus is being carried out, the printing apparatus and the USB device are not shifted into a power saving mode in which energization of the printing apparatus and the USB device is limited. When the USB device and the control apparatus are connected to the printing apparatus, and a communication via the printing apparatus is not being carried out, the printing apparatus and the USB device are shifted into the power saving mode.

9 Claims, 6 Drawing Sheets

COMMUNICATION CONTROL METHOD FOR CONTROLLING COMMUNICATION WITH USB DEVICES, STORAGE MEDIUM, AND PRINTING APPARATUS

BACKGROUND OF THE INVENTION

Field of the Invention

The present invention relates to a communication control method, a storage medium, and a printing apparatus, and in particular to a communication control method for controlling communications with USB devices, a storage medium, and a printing apparatus.

Description of the Related Art

There is known a printing system in which a client PC which is a control apparatus sends print data to an MFP which is a printing apparatus, and the MFP performs printing based on the received print data. In this printing system, functions of the MFP are expanded by connecting USB devices having a variety of functions to the MFP. Examples of USB devices include a large-screen extended touch panel, and a multi-function setting menu, a preview image, and so forth are displayed on the extended touch panel. USB over Network technology (hereafter referred to as "USBNW") is used in a display control process for an extended touch panel of a USB device, and the client PC sends a control signal to the USB device via the MFP, and the USB device displays a setting menu or the like on the extended touch panel based on the received control signal (see, for example, Japanese Patent Publication No. 5745424). A user is allowed to directly operate the USB device. Operating information on user operation is sent from the USB device to the client PC via the MFP, and the client PC sends a control signal, which is for producing a display corresponding to the operation information, to the USB device via the MFP. Namely, signals and information are sent and received between the USB device and the client PC via the MFP. After that, based on the received control signal, the USB device displays a preview image or the like, which corresponds to the user operating information, on the extended touch panel. Here, when the MFP shifts into a power saving mode while the user is operating the USB device, the MFP stops sending and receiving signals and information, and hence the display control process for the extended touch panel of the USB device is hampered. Accordingly, in the printing system, while the USB device is connected to the MFP, the MFP and also the USB device are controlled so as not to shift into the power saving mode.

However, when the MFP and the USB device are controlled so as not to shift into the power saving mode while the USB device is connected the MFP, the MFP and the USB device are in a constant state of being energized irrespective of whether or not the USB device is in use. Thus, even when the USB device is not in use, power is unnecessarily consumed by the MFP and the USB device. Namely, it is conventionally difficult to prevent control over the USB device from being hampered and reduce power consumption at the same time.

SUMMARY OF THE INVENTION

The present invention provides a communication control method which prevents control over the USB device from being hampered and reduces power consumption at the same time, a storage medium, and a printing apparatus.

Accordingly, the present invention provides a communication control method for controlling communications between a USB device and a control apparatus, which controls the USB device, via a printing apparatus, comprising a first determination step of determining whether the USB device has been connected to the printing apparatus, a second determination step of determining whether the control apparatus has been connected to the printing apparatus, a third determination step of determining whether a communication for controlling the USB device is being carried out via the printing apparatus, and an energization control step of controlling energization of the printing apparatus and the USB device, wherein in the energization control step, when the USB device and the control apparatus are connected to the printing apparatus, and a communication via the printing apparatus is being carried out, the printing apparatus and the USB device are not shifted into a power saving mode in which energization of the printing apparatus and the USB device is limited, and when the USB device and the control apparatus are connected to the printing apparatus, and a communication via the printing apparatus is not being carried out, the printing apparatus and the USB device are shifted into the power saving mode.

According to the present invention, it is possible to prevent control over the USB device from being hampered and reduce power consumption at the same time.

Further features of the present invention will become apparent from the following description of exemplary embodiments (with reference to the attached drawings).

DESCRIPTION OF THE EMBODIMENTS

Hereafter, an embodiment of the present invention will be described in detail with reference to the drawings.

Figure 1:
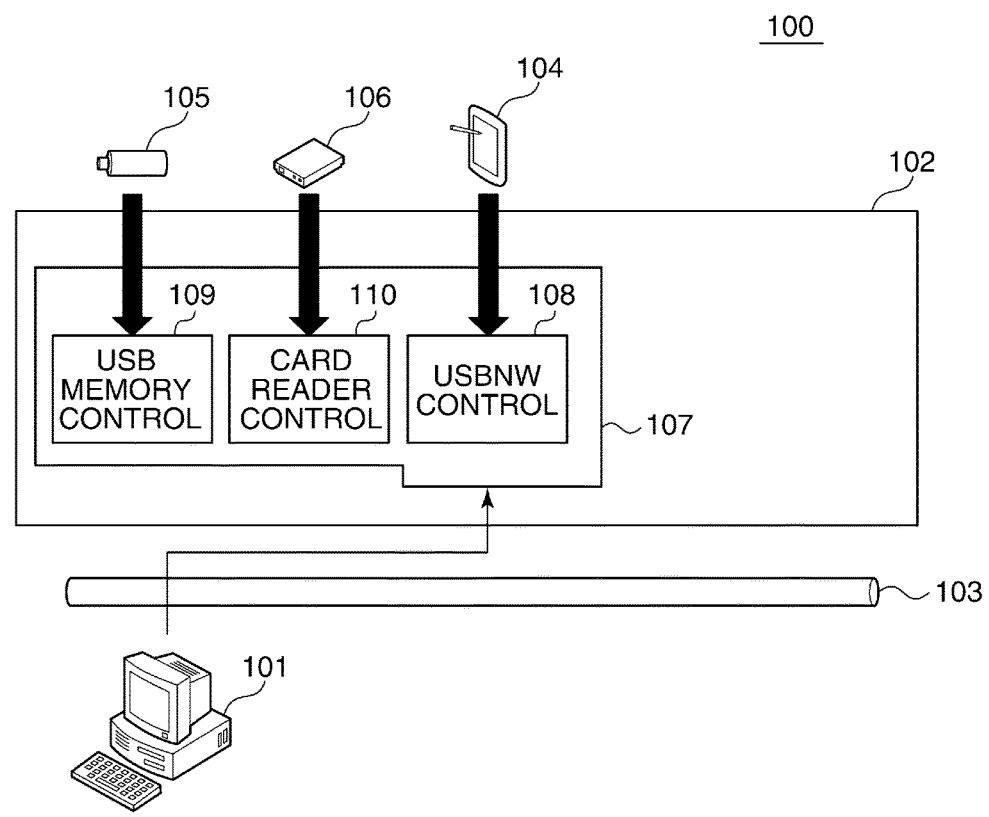
FIG. 1 is a configuration diagram schematically showing an arrangement of a printing system including an MFP which is a printing apparatus according to an embodiment of the present invention.

FIG. 1 is a configuration diagram schematically showing an arrangement of a printing system 100 including an MFP 102 which is a printing apparatus according to the embodiment of the present invention.

Referring to FIG. 1, the printing system 100 has a client PC 101, which is a control apparatus, and the MFP 102, and the client PC 101 and the MFP 102 are connected together via a network 103. The MFP 102 has a software module 107, which has a USBNW control module 108, a USB memory control module 109, and a card reader control module 110. Processes of the software module 107 are carried out by a core unit 201 in FIG. 2 executing a program stored in a ROM 214.

The client PC 101 carries out data communications with the MFP 102 and instructs the MFP 102 to execute jobs. The client PC 101 is also a USBNW control apparatus which controls a USB device compliant with USBNW communications performed by way of the MFP 102 among USB devices connected to the MFP 102. In the following description, the USBNW communications performed by way of the MFP 102 is defined as the USBNW communications, and a USB device compliant with USBNW communications is defined as a USBNW-compliant device. The client PC 101 sends and receives signals and information to and from a USBNW-compliant device via the MFP 102 to control processes carried out by the USBNW-compliant device. The MFP 102 is able to execute jobs such as a copying process, a scanning process, and a faxing process, and for example, performs printing based on image data received from the client PC 101. A plurality of USB devices is connectable to the MFP 102. In the present embodiment, it is assumed that for example, a touch panel UI 104, a USB memory 105, and a card reader 106 are connected as USB devices to the MFP 102. The touch panel UI 104 is a USB device which is a large-screen extended touch panel with a function of offering advanced features to a display control unit 213 in FIG. 2, to be described later, provided in the MFP 102. A multi-function setting menu for making settings on the MFP 102, a preview image, and so forth are displayed on the touch panel UI 1104. The touch panel UI 104 is also a USBNW-compliant device, and a display control process for the touch panel UI 104 is carried out by the client PC 101 which is a USBNW control apparatus for the touch panel UI 104. The USB memory 105 stores a variety of data such as image data. The card reader 106 reads user information from an IC card held over it by a user and performs user authentication based on the user information. The USB memory 105 and the card reader 106 are non-USBNW-compliant devices which are not compliant with the USBNW communications, and processes of the USB memory 105 and the card reader 106 are controlled by the MFP 102.

The USBNW control module 108 is a module that controls a USBNW-compliant device, and in the present embodiment, controls the touch panel UI 104. Upon receiving a packet, which is for controlling display on the touch panel UI 104, from the client PC 101, the USBNW control module 108 transfers the packet to the touch panel UI 104. The USBNW control module 108 also manages a USBNW table 401 in FIG. 4, to be described later, in which information on USBNW-compliant devices and USBNW control apparatuses is set. The USB memory control module 109 includes a storage class driver module and controls the USB memory 105. The card reader control module 110 includes a reader class driver module and controls the card reader 106.

Figure 2:
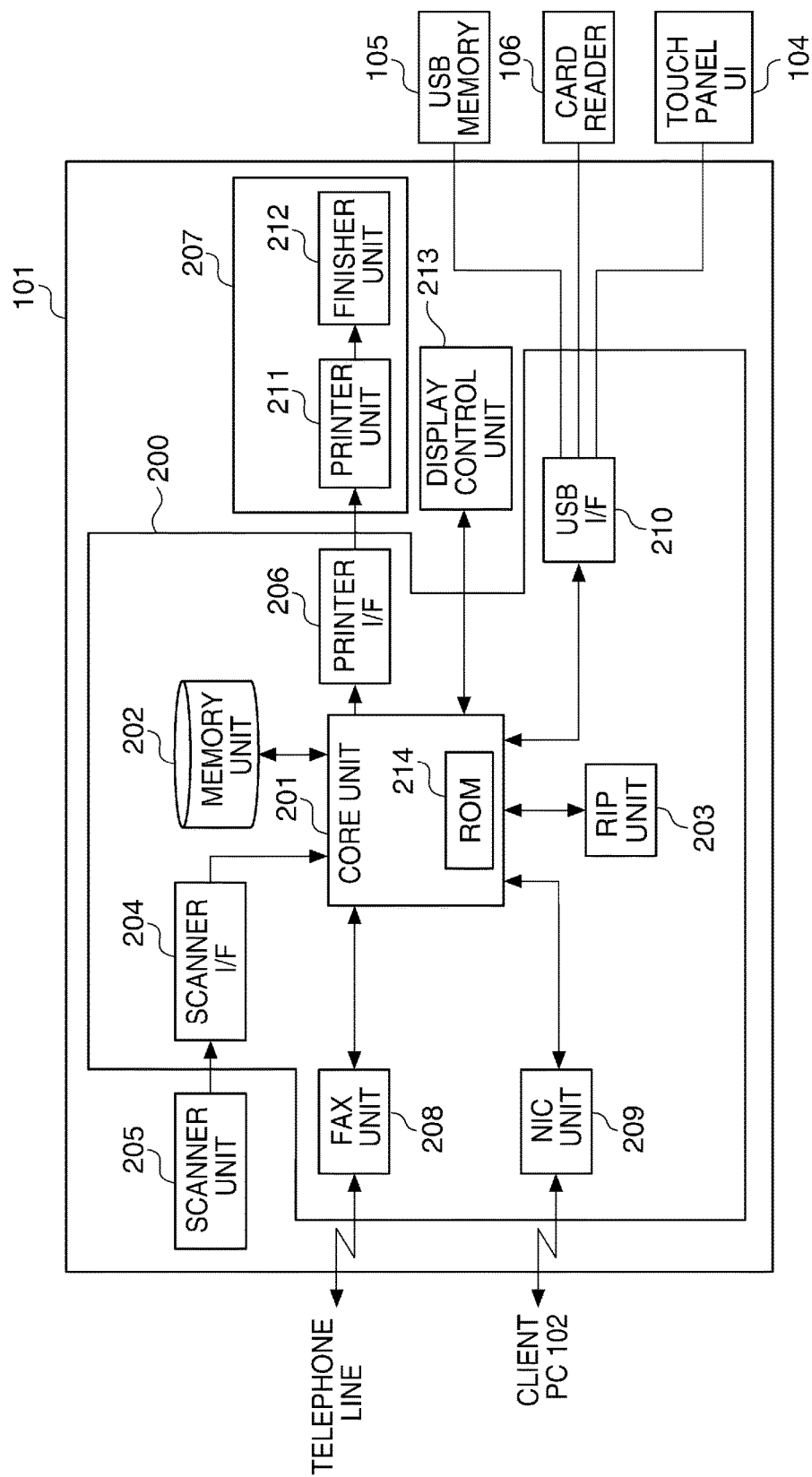
FIG. 2 is a block diagram schematically showing a hardware arrangement of the MFP in FIG. 1.

FIG. 2 is a block diagram schematically showing a hardware arrangement of the MFP 102 in FIG. 1.

Referring to FIG. 2, the MFP 102 has a control unit 200, a scanner unit 205, a print engine 207, and the display control unit 213, and the control unit 200 is connected to the scanner unit 205, the print engine 207, and the display control unit 213. The control unit 200 has the core unit 201, a memory unit 202, a RIP unit 203, a scanner I/F 204, a printer I/F 206, a FAX unit 208, a NIC unit 209, and a USB I/F 210. The core unit 201 is connected to the following component elements: the memory unit 202, the RIP unit 203, the scanner I/F 204, the printer I/F 206, the FAX unit 208, the NIC unit 209, and the USB I/F 210. The core unit 201 has the ROM 214. The print engine 207 has a printer unit 211 and a finisher unit 212, which are connected to each other.

The control unit 200 centrally controls the entire MFP 102. By executing programs stored in the ROM 214, the core unit 201 controls the component elements connected to the core unit 201. When a shifting condition (hereafter referred to as "the condition for shifting into a power saving mode") such as a condition that a job executing instruction is not received for a predetermined time period is satisfied, the core unit 201 shifts the MFP 102 into the power saving mode. In the power saving mode, only limited elements of the MFP 102 are energized, i.e. a minimum component element among the component elements constituting the MFP 102, and more specifically, only the NIC unit 209 is energized. When the MFP 102 has shifted into the power saving mode, the USB device connected to the MFP 102 is not energized. The memory unit 202 is used as a work area for the core unit 201. The memory unit 202 is also used as a temporary storage area for a variety of data. The RIP unit 203 generates raster pattern data by performing RIP processing based on image data obtained from the client PC 101. The scanner I/F 204 controls communications with the scanner unit 205, and the printer I/F 206 controls communications with the print engine 207. The FAX unit 208 carries out facsimile communications with an external apparatus via a telephone line. The NIC unit 209 carries out data communications with the client PC 101 or the like which is connected via the network 103. In the present embodiment, in a case where the MFP 102 has shifted into the power saving mode, when the NIC unit 209 receives a return packet (order notification) ordering return of the MFP 102 from the power saving mode, from the client PC 101, the MFP 102 returns from the power saving mode. The USB I/F 210 carries out data communications with USB devices connected to the MFP 102, and more specifically, the touch panel UI 104, the USB memory 105, and the card reader 106. The USB I/F 210 also energizes USB devices connected to the MFP 102. The scanner unit 205 reads an original placed on an original platen glass, no shown, and generates image data. The print engine 207 carries out a printing process by controlling the printer unit 211 and the finisher unit 212. Specifically, the printer unit 211 performs printing on a sheet based on image data obtained from the printer I/F 206, and the finisher unit 211 performs post-processing such as stapling on the printed sheet. The display control unit 213 has a display unit and an operating unit, neither of which is shown, displays a variety of information on the MFP 102 and receives input information input through operation on the operating unit by a user (receiving step).

Figures 3, 4:
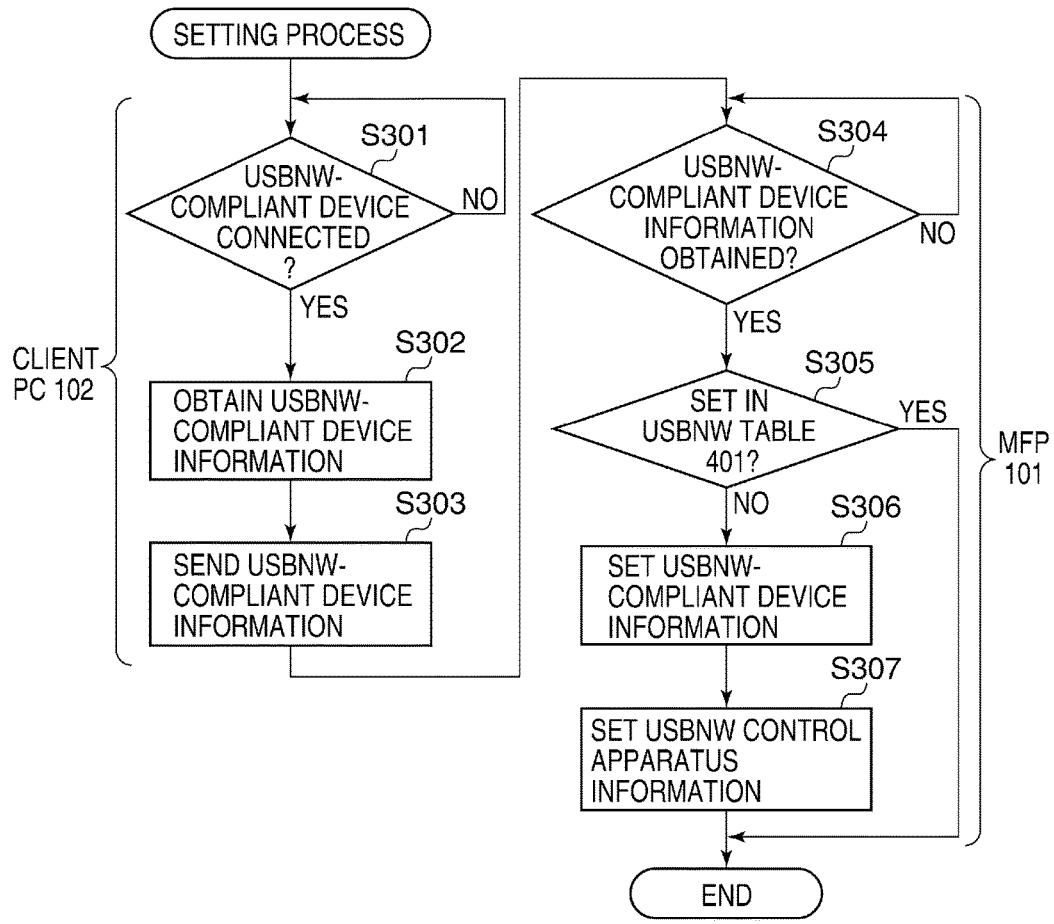
FIG. 3 is a flowchart showing the procedure of a setting process which is carried out by a client PC and the MFP in FIG. 1.
FIG. 4 is a view showing an exemplary USBNW table which is managed by the MFP in FIG. 1.

FIG. 3 is a flowchart showing the procedure of a setting process which is carried out by the client PC 101 and the MFP 102 in FIG. 1.

The process in FIG. 3 is based on the assumption that, for example, the client PC 101, which is a USBNW control apparatus for the touch panel UI 104 which is a USBNW-compliant device, is set in the USBNW table 401, to be described later. The process in FIG. 3 is carried out in response to the touch panel UI 104 being connected to the client PC 101 before being connected to the MFP 102.

Referring to FIG. 3, first, the client PC 101 determines whether or not a USBNW-compliant device has been connected (step S301). Next, when the touch panel UI 104 has been connected as a USBNW-compliant device (YES in the step S301), the client PC 101 obtains USBNW-compliant device information from the touch panel UI 104 (step S302).

Specifically, the client PC 101 obtains device information such as vender ID (VID) information and product ID (PID) information on the touch panel UI 104 as the USBNW-compliant device information from the touch panel UI 104. Then, the client PC 101 sends the obtained USBNW-compliant device information to the MFP 102 (step S303).

Upon receiving the USBNW-compliant device information from the client PC 101 (YES in the step S304), the MFP 102 determines whether or not the obtained USBNW-compliant device information is set in the USBNW table 401 (step S305). The USBNW table 401 includes registered device numbers 402, USB device identification information 403, and control apparatus identification information 404. As the registration device numbers 402, consecutive numbers assigned to USBNW-compliant devices are set in the order in which they were registered. As the USB device identification information 403, USBNW-compliant device information, for example, VID information and PID information on USBNW-compliant devices is set. As the control apparatus identification information 404, USBNW control apparatus information, for example, MAC address information and IP address information on USBNW control apparatuses for USBNW-compliant devices is set.

As a result of the determination in the step S305, when the obtained USBNW-compliant device information is set in the USBNW table 401, the MFP 102 ends the present process. On the other hand, when the obtained USBNW-compliant device information is not set in the USBNW table 401, the MFP 102 sets new USBNW-compliant device information as the USB device identification information 403 in the USBNW table 401 (step S306). Then, the MFP 102 sets USBNW control apparatus information on the client PC 101 as the control apparatus identification information 404 associated with the set USB device identification information 403 (step S307). This completes registration of the touch panel UI 104 and the client PC 101. In the present embodiment, only when a registered USBNW-compliant device and a registered USBNW control apparatus are connected to the MFP 102, a USBNW communication between the USBNW-compliant device and the USBNW control apparatus is established. After that, the MFP 102 carries out the process in the step S307 and then ends the present process.

Here, for example, when the MFP 102 shifts into the power saving mode while a user is operating on the touch panel UI 104 connected to the MFP 102, the MFP 102 stops sending and receiving signals and information, and this hampers a display control process for the touch panel UI 104. On the other hand, according to conventional arts, while the touch panel UI 104 is kept in connection with the MFP 102, the MFP 102 and also the touch panel UI 104 are controlled so as not to shift into the power saving mode. However, when the above control is provided while the touch panel UI 104 is connected to the MFP 102, the MFP 102 and the touch panel UI 104 are in a constant state of being energized irrespective of whether or not the touch panel UI 104 is in use. Thus, even when the touch panel UI 104 is not in use, power is unnecessarily consumed by the MFP 102 and the touch panel UI 104. Namely, according to conventional arts, it is difficult to prevent control over the touch panel UI 104 from being hampered and reduce power consumption at the same time.

On the other hand, in the present embodiment, energization of the MFP 102 and a USBNW-compliant device is controlled according to whether or not a USBNW communication is performed.

Figure 5:
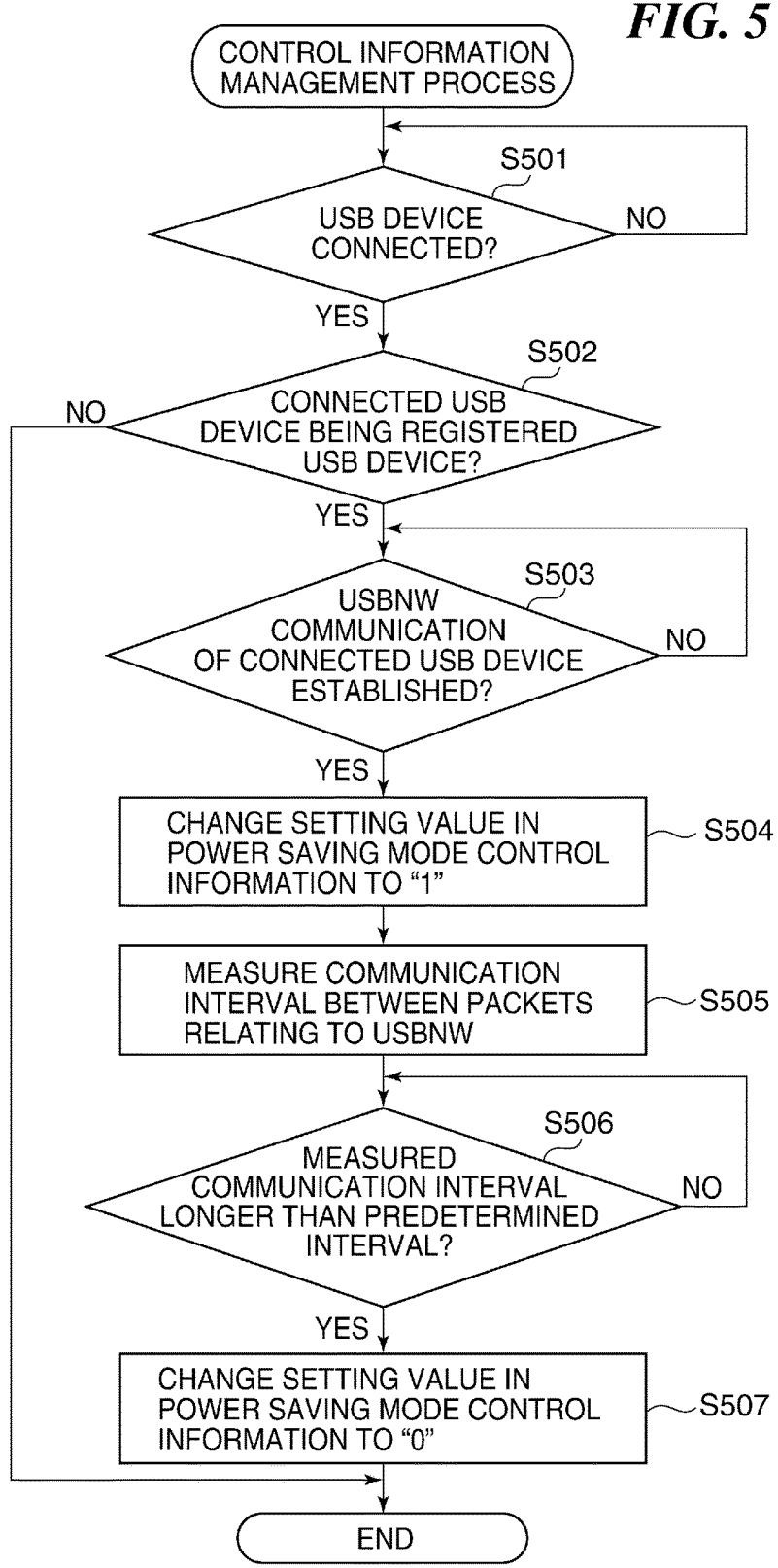
FIG. 5 is a flowchart showing the procedure of a control information management process which is carried out by the MFP in FIG. 1.

FIG. 5 is a flowchart showing the procedure of a control information management process which is carried out by the MFP 102 in FIG. 1.

The process in FIG. 5 is carried out by the core unit 201 executing a program stored in the ROM 214.

Referring to FIG. 5, first, when a USB device is connected to the MFP 102 (YES in step S501), the core unit 201 obtains device information on the USB device connected to the MFP 102 (hereafter referred to as "the connected USB device") from the connected USB device. Next, based on the obtained device information on the USB device, the core unit 201 determines whether or not the connected USB device is a USBNW-compliant device (hereafter referred to as "a registered USB device") registered in the USBNW table 401 (step S502). In the step S502, for example, when the obtained device information on the USB device corresponds to the USB device identification information 403 in the USBNW table 401, the core unit 201 determines that the connected USB device is a registered USB device. On the other hand, when the obtained device information on the USB device does not correspond to the USB device identification information 403 in the USBNW table 401, the core unit 201 determines that the connected USB device is not a registered USB device.

As a result of the determination in the step S502, when the connected USB device is not a registered USB device, the core unit 201 ends the present process. On the other hand, as a result of the determination in the step S502, when the connected USB device is a registered USB device, the core unit 201 determines whether or not a USBNW communication of the connected USB device has been established (step S503). Specifically, when a USBNW control apparatus for the connected USB device is connected to the MFP 102, and a packet relating to a USBNW communication is received from the USBNW control apparatus, the core unit 201 determines that a USBNW communication of the connected USB device has been established. On the other hand, when no USBNW control apparatus is connected to the MFP 102, or when no packet relating to a USBNW communication is received from the USBNW control apparatus, the core unit 201 determines that a USBNW communication of the connected USB device has not been established. The core unit 201 carries out the process in the step S503 until a USBNW communication of the connected USB device has been established. After that, when a USBNW communication of the connected USB device has been established (YES in the step S503), the core unit 201 changes a setting value in the power saving mode control information, which is for controlling shifting of the MFP 102 into the power saving mode, from a default value (step S504). A setting value "0" or "1" is set in the power saving mode control information, and "0" is set in advance as a default value. When the setting value "0" is set in the power saving mode control information, and the condition for shifting into the power saving mode is satisfied, the core unit 201 provides control to shift the MFP 102 and the connected USB device into the power saving mode. On the other hand, when the setting value "1" is set in the power saving mode control information, the core unit 201 provides control such that the MFP 102 and the connected USB device do not shift into the power saving mode even when the condition for shifting into the power saving mode is satisfied. Namely, in the present embodiment, when a USBNW-compliant device and a USBNW control apparatus are connected to the MFP 102, and a USBNW communication is being carried out, the MFP 102 and the USBNW-compliant device do not shift into the power saving mode. On the other hand, when at least one of a USBNW-compliant device and a USBNW control apparatus is not connected to the MFP 102, the MFP 102 and the USBNW-compliant device shift into the power saving mode. The core unit 201 then measures a communication interval between received packets relating to the USBNW (step S505) and determines whether or not the measured communication interval is longer than a predetermined interval set in advance (step S506). The core unit 201 repeats the process in the Step 506 until the measured communication interval becomes longer than the predetermined interval. When the measured communication interval is longer than the predetermined interval (YES in the step S506), the core unit 201 determines that no USBNW communication is being carried out, and changes the setting value in the power saving mode control information on the connected USB device from "1" to "0" (step S507). Namely, in the present embodiment, when a USBNW-compliant device and a USBNW control apparatus are connected to the MFP 102, and a USBNW communication is not being carried out via the MFP 102, the MFP 102 and the USBNW-compliant device shift into the power saving mode. After that, the core unit 201 ends the present process.

Figure 6:
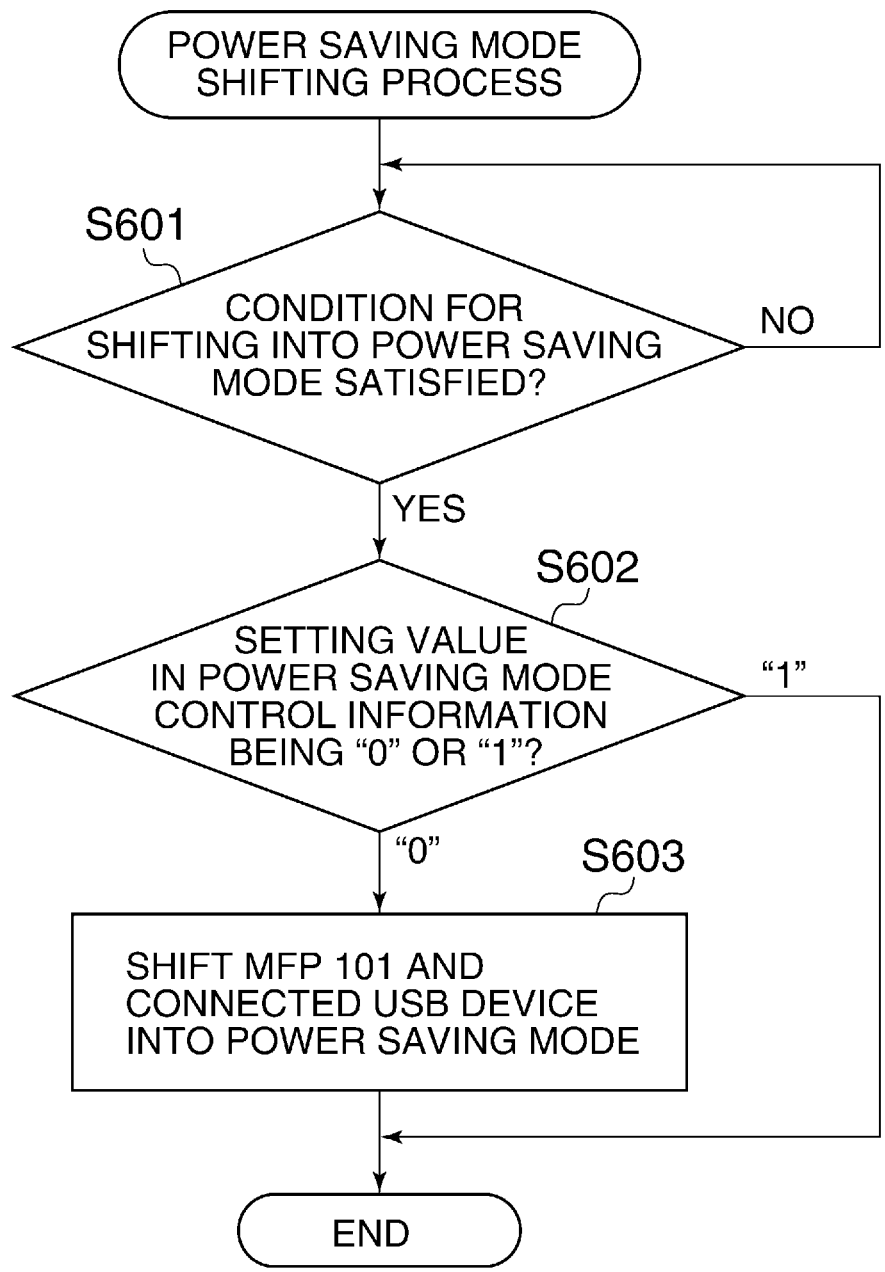
FIG. 6 is a flowchart showing a power saving mode shifting process which is carried out by the MFP in FIG. 1.

FIG. 6 is a flowchart showing a power saving mode shifting process which is carried out by the MFP 102 in FIG. 1.

The process in FIG. 6 is carried out by the core unit 201 executing a program stored in the ROM 214 and is based on the assumption that the connected USB device is a USBNW-compliant device.

Referring to FIG. 6, first, the core unit 201 determines whether or not the condition for shifting into the power saving mode is satisfied (step S601). Next, when the condition for shifting into the power saving mode is satisfied (YES in the step S601), the core unit 201 determines whether the setting value in the power saving mode control information is "0" or "1" (step S602).

As a result of the determination in the step S602, when the setting value in the power saving mode control information is "1", the core unit 201 ends the present process without shifting the MFP 102 and the connected USB device into the power saving mode. On the other hand, as a result of the determination in the step S602, when the setting value in the power saving mode control information is "0", the core unit 201 shifts the MFP 102 and the connected USB device into the power saving mode (step S603) and ends the present process.

Figure 7:
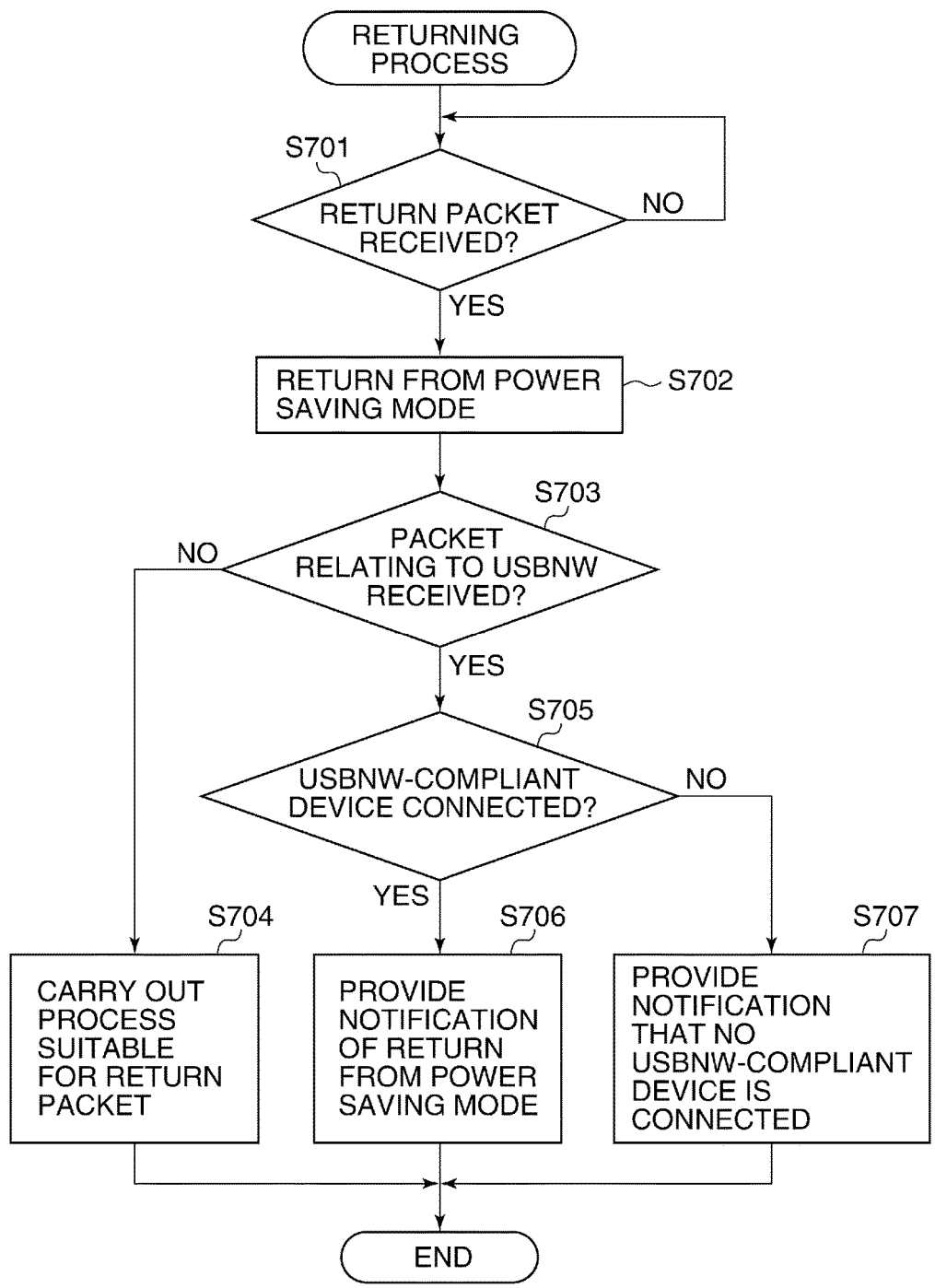
FIG. 7 is a flowchart showing a returning process which is carried out by the MFP in FIG. 1.

FIG. 7 is a flowchart showing a returning process which is carried out by the MFP 102 in FIG. 1.

The process in FIG. 7 is carried out by the core unit 201 executing a program stored in the ROM 214 and is based on the assumption that it is carried out after the MFP 102 and the connected USB device are shifted into the power saving mode by the process in FIG. 6.

Referring to FIG. 7, first, upon receiving a return packet from the client PC 101 (YES in step S701), the core unit 201 causes the MFP 102 and the connected USB device to return from the power saving mode (step S702) (return control step). Next, the core unit 201 determines whether or not a packet relating to the USBNW has been received (step S703).

As a result of the determination in the step S703, when no packet relating to the USBNW has been received, the core unit 201 carries out a process suitable for the return packet (step S704) and ends the present process. On the other hand, as a result of the determination in the step S703, when a packet relating to the USBNW has been received, the core unit 201 determines whether or not a USBNW-compliant device is connected (step S705).

As a result of the determination in the step S705, when a USBNW-compliant device is connected, the core unit 201 notifies the client PC 101 that the MFP 102 and the USBNW-compliant device have returned from the power saving mode (step S706) and ends the present process. On the other hand, as a result of the determination in the step S705, when no USBNW-compliant device is connected, the core unit 201 notifies the client PC 101 that no USBNW-compliant device is connected (step S707) and ends the present process.

According to the processes in FIGS. 5 to 7 described above, when a USBNW-compliant device and a USBNW control apparatus are connected to the MFP 102, and a USBNW communication is being carried out, the MFP 102 and the USBNW-compliant device are not shifted into the power saving mode. When a USBNW-compliant device and a USBNW control apparatus are connected to the MFP 102, and a USBNW communication is not being carried out, the MFP 102 and the USBNW-compliant device are shifted into the power saving mode. Namely, according to whether or not a USBNW communication is being carried out, energization of the MFP 102 and a USBNW-compliant device is controlled. This prevents control over a USBNW-compliant device from being hampered and reduces power consumption at the same time.

Moreover, according to the processes in FIGS. 5 to 7 described above, when at least one of a USBNW-compliant device and a USBNW control apparatus is not connected to the MFP 102, the MFP 102 and the USBNW-compliant device shift into the power saving mode. Here, when at least one of a USBNW-compliant device and a USBNW control apparatus is not connected to the MFP 102, a USBNW communication is not carried out, and hence control over a USBNW-compliant device is prevented from being hampered even when power consumption is reduced.

Further, according to the processes in FIGS. 5 to 7 described above, when the MFP 102 and a USBNW-compliant device shift into the power saving mode, the MFP 102 and the USBNW-compliant device return from the power saving mode based on a return packet sent from a USBNW control apparatus. As a result, even when the MFP 102 and a USBNW-compliant device shift into the power saving mode, the MFP 102 and the USBNW-compliant device are reliably caused to return from the power saving mode.

In the present embodiment described above, when a USBNW-compliant device and a USBNW control apparatus are connected the MFP 102, and the MFP 102 and the USBNW-compliant device are not shifted into the power saving mode, an instruction to perform energization may not be accepted from a user. Specifically, when the setting value in the power saving mode control information is set at "1", an instruction to change the setting value in the power saving mode control information from "1" to "0" is not accepted from a user through operation on the display control unit 213 or the like. This avoids a situation in which the MFP 102 and a USBNW-compliant device are forced to be energized in response to an instruction from a user even though the MFP 102 and the USBNW-compliant device are not shifted into the power saving mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-021842, filed Feb. 8, 2016 which is hereby incorporated by reference herein in its entirety.

What is claimed is:

1. A communication control method of controlling a printing apparatus that controls communications between a USB device and a control apparatus, which controls the USB device, the control method comprising:
   determining whether the USB device has been connected to the printing apparatus;
   determining whether the control apparatus has been connected to the printing apparatus;
   determining whether a communication for controlling the USB device is being carried out via the printing apparatus; and
   controlling supply of power to the printing apparatus and the USB device,
   wherein, when the USB device and the control apparatus are connected to the printing apparatus, and a communication via the printing apparatus is being carried out, the printing apparatus and the USB device are not shifted into a power saving mode in which supply of power to the printing apparatus and the USB device is limited, and when the USB device and the control apparatus are connected to the printing apparatus, and a communication via the printing apparatus is not being carried out, the printing apparatus and the USB device are shifted into the power saving mode.

2. The communication control method according to claim 1, wherein, when at least one of the USB device and the control apparatus is not connected to the printing apparatus, the printing apparatus and the USB device are shifted into the power saving mode.

3. The communication control method according to claim 1, further comprising receiving an instruction to perform supply of power from a user,
   wherein, when the USB device and the control apparatus are connected to the printing apparatus, and the printing apparatus and the USB device are not shifted into the power saving mode, the instruction is not accepted from the user.

4. The communication control method according to claim 1, further comprising, when the printing apparatus and the USB device have shifted into the power saving mode, causing the printing apparatus and the USB device to return from the power saving mode based on a notification of an instruction to return from the power saving mode, which is transmitted from the control apparatus.

5. A non-transitory computer-readable storage medium storing a program for causing a computer to execute a communication control method of controlling a printing apparatus that controls communications between a USB device and a control apparatus, which controls the USB device, the communication control method comprising:
   determining whether the USB device has been connected to the printing apparatus;
   determining whether the control apparatus has been connected to the printing apparatus;
   determining whether a communication for controlling the USB device is being carried out via the printing apparatus; and
   controlling supply of power to the printing apparatus and the USB device,
   wherein when the USB device and the control apparatus are connected to the printing apparatus, and a communication via the printing apparatus is being carried out, the printing apparatus and the USB device are not shifted into a power saving mode in which supply of power to the printing apparatus and the USB device is limited, and when the USB device and the control apparatus are connected to the printing apparatus, and a communication via the printing apparatus is not being carried out, the printing apparatus and the USB device are shifted into the power saving mode.

6. A printing apparatus that carries out communications and controls communications between a USB device and a control apparatus, which controls the USB device, via a printing apparatus, comprising:
   a processor; and
   a memory storing instructions which, when executed by the processor, cause the printing apparatus to:
   determine whether the USB device has been connected to the printing apparatus;
   determine whether the control apparatus has been connected to the printing apparatus;
   determine whether a communication for controlling the USB device is being carried out via the printing apparatus; and
   control supply of power to the printing apparatus and the USB device,
   wherein when the USB device and the control apparatus are connected to the printing apparatus, and a communication via the printing apparatus is being carried out, the printing apparatus and the USB device are not shifted into a power saving mode in which supply of power to the printing apparatus and the USB device is limited, and when the USB device and the control apparatus are connected to the printing apparatus, and a communication via the printing apparatus is not being carried out, the printing apparatus and the USB device are shifted into the power saving mode.

7. The printing apparatus according to claim 6, wherein when at least one of the USB device and the control apparatus is not connected to the printing apparatus, the printing apparatus and the USB device are not shifted into the power saving mode.

8. The printing apparatus according to claim 6, further comprising an interface configured to receive an instruction to perform supply of power from a user,
   wherein when the USB device and the control apparatus are connected to the printing apparatus, and the printing apparatus and the USB device are not shifted into the power saving mode, the interface does not accept the instruction.

9. The printing apparatus according to claim 6, wherein the instructions, when executed by the processor, further cause the printing apparatus to:
   cause, when the printing apparatus and the USB device have shifted into the power saving mode, the printing apparatus and the USB device to return from the power saving mode based on a notification of an instruction to return from the power saving mode, which is transmitted from the control apparatus.

\* \* \* \* \*